US 6,625,918 B2

(12) United States Patent
Bhullar

(10) Patent No.: US 6,625,918 B2
(45) Date of Patent: Sep. 30, 2003

(54) PEST DETERRENT

(76) Inventor: Tarseam S. Bhullar, 5320 Ontario St., Vancouver, British Columbia (CA), V5W 2L7

(*) Notice: Subject to any disclaimer, the term of this patent is extended or adjusted under 35 U.S.C. 154(b) by 6 days.

(21) Appl. No.: 09/998,217

(22) Filed: Dec. 3, 2001

(65) Prior Publication Data

US 2003/0101633 A1 Jun. 5, 2003

(51) Int. Cl.[7] ............................................... F21K 7/00
(52) U.S. Cl. ........................ 43/1; 248/125.2; 362/259; 340/557
(58) Field of Search ...................... 43/1, 124; 340/556, 340/557, 573.2; 362/259; 248/161, 163.1, 125.2, 122.1, 125.1; 396/419

(56) References Cited

U.S. PATENT DOCUMENTS

| 4,832,296 A | * | 5/1989 | Schnepp | 248/168 |
| 5,176,401 A | * | 1/1993 | Chapman | 248/132 |
| 5,188,323 A | * | 2/1993 | David | 248/125.1 |
| 5,210,656 A | * | 5/1993 | Williamson | 359/855 |
| 5,306,871 A | * | 4/1994 | Lai | 174/50 |
| 5,343,652 A | * | 9/1994 | Johnson | 43/132.1 |
| 5,355,835 A | * | 10/1994 | Freed | 119/57.9 |
| 5,857,282 A | | 1/1999 | Odintsov | 43/1 |
| 5,892,446 A | * | 4/1999 | Reich | 119/720 |
| 5,915,949 A | * | 6/1999 | Johnson | 43/124 |
| 5,964,524 A | * | 10/1999 | Qian | 248/170 |
| 5,969,593 A | * | 10/1999 | Will | 119/174 |
| 5,986,551 A | | 11/1999 | Pueyo et al. | 340/573 |
| 6,031,649 A | * | 2/2000 | Cotty et al. | 359/196 |
| 6,213,626 B1 | * | 4/2001 | Qian | 248/125.8 |
| 6,250,255 B1 | | 7/2001 | Lenhardt et al. | 119/713 |
| 6,289,825 B1 | * | 9/2001 | Long | 108/147 |
| 6,375,370 B1 | * | 4/2002 | Wesselink et al. | 348/143 |
| 6,575,597 B1 | * | 6/2003 | Cramer et al. | 362/259 |

FOREIGN PATENT DOCUMENTS

| DE | 3825389 A | * | 2/1990 | ........... A01M/01/22 |
| FR | 2 676 618 A | | 11/1992 | |

OTHER PUBLICATIONS

"Bird vision—Ultrasexy," *The Economist*, Aug. 9th, 1997, pp. 71,72.

* cited by examiner

Primary Examiner—Charles T. Jordan
Assistant Examiner—Susan C. Alimenti
(74) Attorney, Agent, or Firm—Richard C. Litman

(57) ABSTRACT

A repellent laser beam device for preventing pests, such as birds, from feeding on fruits in a field. The device is mounted on a tripod and housed in a weather-protected box. It is mounted so as to be adjustable in height and angle of the device. A control unit causes a laser beam to sweep a field in vertical and horizontal patterns, frightening birds and other pests away. The laser beam is of a wavelength seen by birds or other animals and merely frightens them away rather than blinding them. The patterns and speed of the scanning device is variable. The device is powered by a rechargeable gel pack battery. The range of wavelengths of the laser light beam is preferably from about 432 nanometers to about 633 nanometers. It is known that birds' eyes are sensitive to both ultraviolet light and human-visible light.

6 Claims, 5 Drawing Sheets

PEST DETERRENT

BACKGROUND OF THE INVENTION

1. Field of the Invention

The present invention relates to pest control devices. More particularly, the present invention relates to laser beam devices useful for repelling pests such as birds.

2. Description of the Related Art

Birds and animal pests are destructive to crops such as fruits, etc. Many devices have been proposed for frightening such pests away from a field by blinding or destroying pests, some of which are described below. One common device is a propane cannon which emits an intermittent loud noise, typically every five to ten minutes. It would be desirable to provide a system which frightens birds away from a field without the use of loud noises or mechanical devices which are effective over only a short distance and require substantial energy and maintenance.

U.S. Pat. No. 5,343,652, issued Sep. 6, 1994, to Johnson, describes a pest control apparatus which emits a laser beam which uses a scanner to scan over a defined agricultural area while destroying the sensory organs of the pest and thus incapacitating the pest. The laser beam of the Johnson device is trained on the crops and thus may cause crop damage.

U.S. Pat. No. 5,857,282, issued Jan. 12, 1999, to Odintsov describes a system for removing insects from a field by scanning the field by an aggregate light beam consisting of a search light and a superimposed laser light which attracts pests from the field and then turns away from the field with the trapped insects and dumps them at a distance away from the field where their eggs are laid in a non growth sustaining environment.

U.S. Pat. No. 5,986,551, issued Nov. 16, 1999, to Pueyo et al., describes a method for preserving an area against birds and pest animals by dislodging them from the area and permanently preventing them from settling in the area by using frightening devices such as rotating hunter mannequins, falcon imitators, and distress and special cries and other sound alarms.

U.S. Pat. No. 6,250,255 B1, issued Jun. 26, 2001, to Lenhardt et al., describes a method and apparatus for repelling birds from a specific area by using pulsing microwaves, vibration, or supersonic sound waves.

U.S. Pat. No. 4,915,949, issued Jun. 29, 1999, to Johnson, describes a method and apparatus for pest control by utilizing a laser beam to exterminate the pests behind solid barriers.

None of the above inventions and patents, taken either singularly or in combination, is seen to describe the instant invention as claimed. Thus, a pest deterrent solving the aforementioned problems is desired.

SUMMARY OF THE INVENTION

The present invention is a repellent laser beam for preventing pests, such as birds, from feeding on fruits in an agricultural field. The device is mounted on a tripod and housed in a weather-protected box. The device is mounted so as to be adjustable in height and angle. In use, a control unit causes a laser beam to sweep a field in vertical and horizontal patterns, frightening birds and other pests away, preventing them from feeding on the fruits. The laser beam is of a wavelength seen by birds or other animals and merely frightens them away rather than blinding them. The patterns and speed of the scanning device are variable as controlled by the control system. The device is powered by a rechargeable gel pack battery.

The range of wavelengths of the laser light beam is preferably from about 432 nanometers to about 633 nanometers. It is known that birds' eyes are sensitive to both ultraviolet light and human-visible light. This subject is discussed in the article "Bird vision—Ultrasexy" in *The Economist*, Aug. 9, 1997, pp. 71–72. This wavelength range is selected to maximize impact to a bird's eye by choosing wavelengths which are within the overlap area of ultraviolet and human-visible light, thus increasing the effectiveness of the inventive device.

Accordingly, it is a principal object of the invention to provide a system for frightening birds and other pests from feeding on fruit or other crops in a field.

It is another object of the invention to provide a system as above which is compact and requires a minimum amount of energy to operate.

It is a further object of the invention to provide a system as above which does not blind or harm the birds or other animals Still another object of the invention is to provide a system as above which employs a scanning laser light which is visible to and has particular impact on birds.

Yet another object of the invention is to provide a system as above which is mounted on a tripod, allowing it to be raised or lowered to a desired height and the scanning laser to be directed at a desired angle relative to the ground.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a laser device for producing a scanning repellent laser beam for preventing pests, such as birds, from feeding on fruits in an agricultural field. The device is mounted on a tripod and housed in a weather-protected box. The device is mounted so as to be adjustable in height and angle. In use, a control unit causes a laser beam to sweep a field in vertical and horizontal patterns, frightening birds and other pests away, preventing them from feeding on the fruits. The laser beam is of a wavelength seen by birds or other animals and merely frightens them away rather than blinding them. The patterns and speed of the scanning device are variable as controlled by a control system. The device is powered by a rechargeable gel pack battery.

Figure 1:
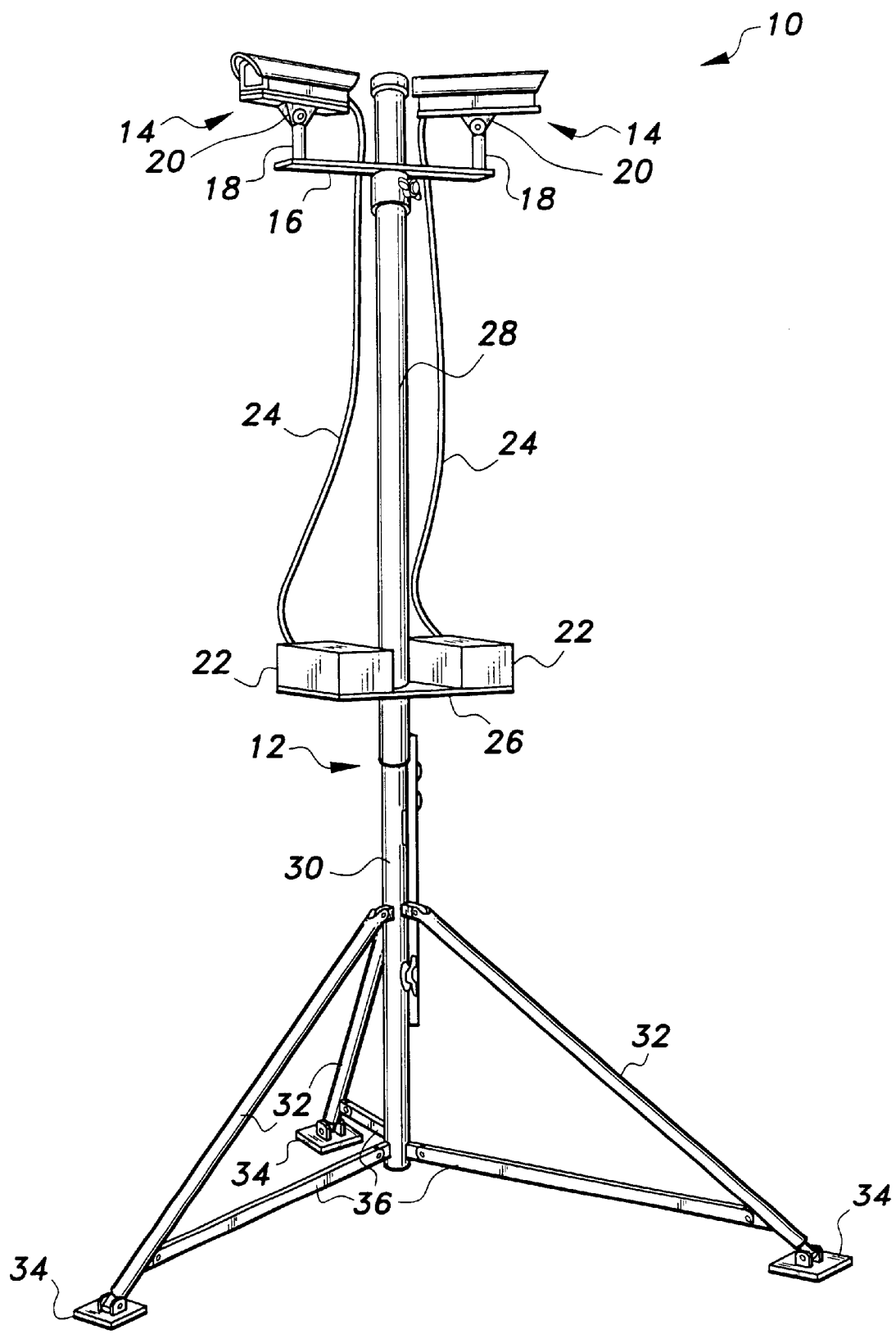
FIG. 1 is a perspective view of a pest deterrent system according to the present invention.

Referring to FIG. 1, there is shown a perspective view of the inventive pest deterrent laser system designated as 10. System 10 comprises a tripod 12 and scanning laser units 14 supported thereby. Laser units 14 are pivotally and rotatably supported by laser support head platform 16 by means of laser rotatable pivot supports 18 respectively connecting platform 16 with laser pivot brackets 20 located on the underside of laser units 14. Laser units 14 are powered and controlled by power supply and laser control boxes 22, supported by power supply platform 26, and connected to laser units 14 by respective power and control signal cables 24.

Tripod 12 comprises a central mast having upper mast portion 28 and lower mast portion 30. Tripod legs 32 are spaced around and pivotally mounted to tripod lower mast portion 30 and rest on respective tripod feet 34. Tripod leg tie rods 36 attach lower mast portion 30 with legs 32 near feet 34 to form a rigid support for tripod 12 on the ground or other desired surface.

Figure 2:
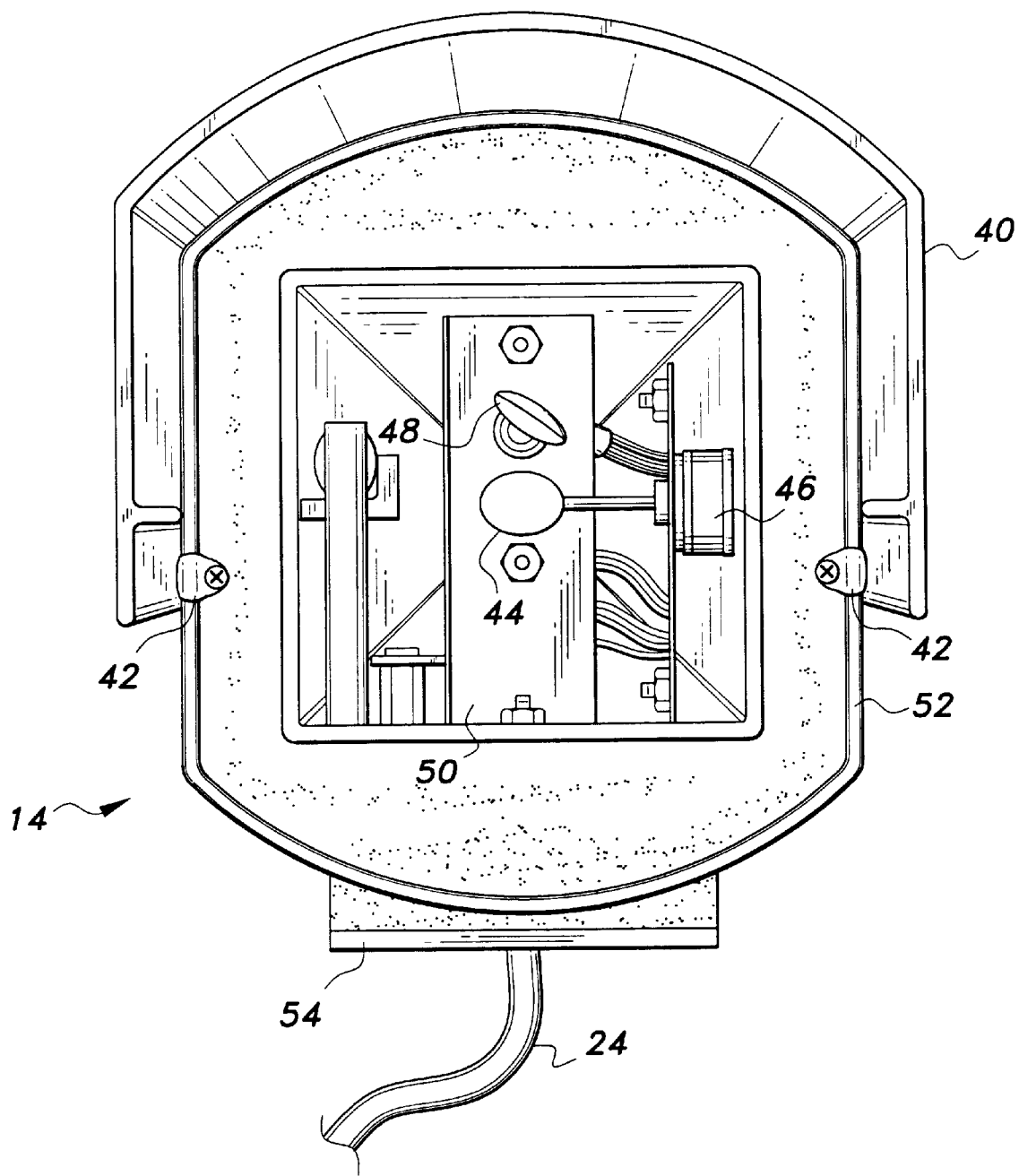
FIG. 2 is a detail view of the laser scanner of the pest deterrent system of FIG. 1.

Referring to FIG. 2, there is shown a detail view of the laser light-emitting end of a laser unit 14 wherein laser unit 14 is covered by laser unit waterproof upper housing 40 by means of laser unit housing supports 42. Radial scanning mirror 44 is driven by radial scanning mirror drive actuator 46 and axial scanning mirror 48 is driven by an axial scanning mirror drive actuator (not shown) so as to provide desired scanning of a laser beam axially emitted from an emitter (not shown). The laser beam emitter and scanning mirrors as acted upon by the scanning mirrors are well known as see U.S. Pat. No. 5,343,652, the disclosure of which is hereby incorporated by reference, and see in particular column 4, lines 51–63 and the accompanying FIG. 1, thereof. The laser unit 14 has a casing 52 housing the internal parts of laser unit 14, upper housing 40 being attached thereto by supports 42. Laser unit casing 52 rests in laser unit support and cradle 54.

Figure 3:
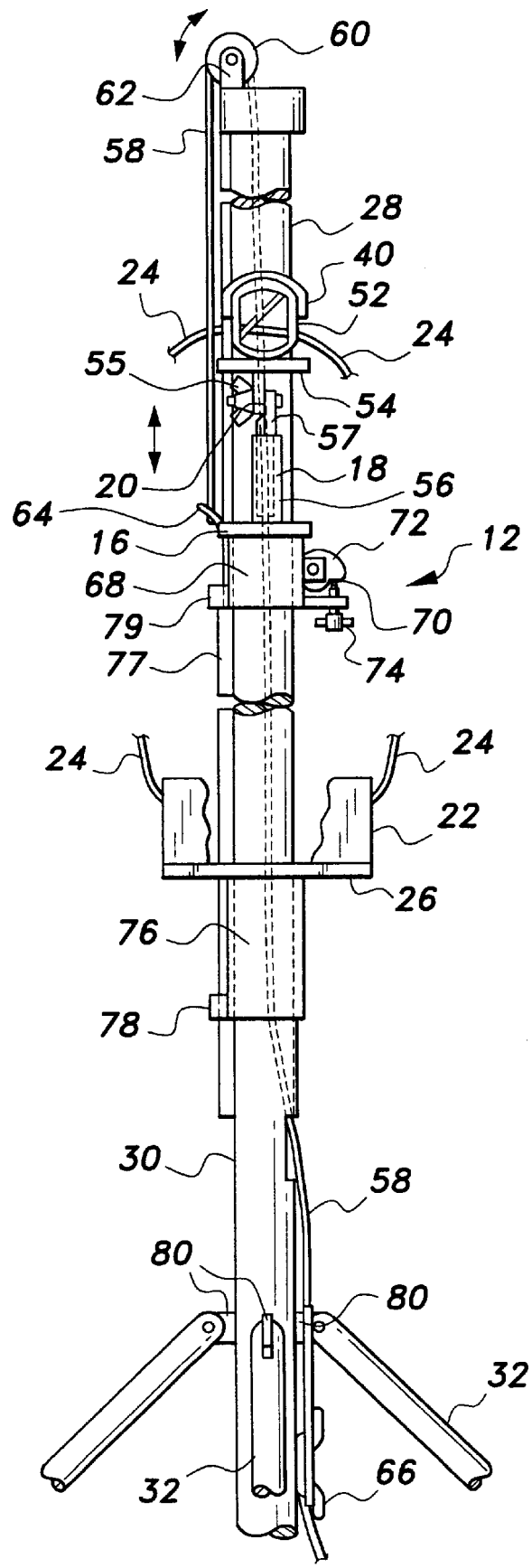
FIG. 3 is a side detail view of the upper portion of the adjustable tripod of FIG. 1 showing the upper adjustable halyard.

Referring to FIG. 3 there is shown a side detail view of the adjustable tripod of the present invention showing the upper adjustable halyard and provision for adjusting the height of the laser support platform. Laser pivot bracket 20 is mounted to the underneath of laser unit support and cradle 54 and is rotatable relative to laser pivot support 18 and may be tightened at a desired angle by tightening laser pivot bracket locking thumbscrew 55 so as to determine the angle at which laser unit 14 is directed relative to the horizontal.

Supports 18 comprise vertical outer cylindrical tubes 56 connected at their respective bases to connecting platform 16. Cylindrical laser unit supports 57 rest within and are concentric with tubes 56 and are free to rotate therein to a desired position by action of a user. Supports 57 extend upward to laser pivot brackets 20 located on the underside of laser units 14.

Head platform halyard 58 is directed over halyard pulley 60 mounted to the top end of tripod upper mast portion 28 and is connected at one end to laser support head platform 16 by means of head platform halyard connector 64 and secured at the other end to halyard turnbuckle 66 mounted on tripod lower mast 30, thus allowing height adjustment of head platform 16 relative to power supply platform 26. Head platform 16 is supported by head platform sleeve 68, allowing up and down travel of head platform 16 relative to tripod upper mast portion 28.

A cam lock 70 comprises a lock cam 72 rotatably mounted to head platform sleeve 68 and is selectively rotated by manipulation of cam lock adjustment pin 74 mounted on a horizontal extension of head platform sleeve 68, such that lock cam 72 may be rotated into a locking position through a corresponding slit (not shown) in sleeve 68 and against upper mast portion 28. The lock cam 72 may be allowed to rotate into an unlocked position by loosening cam lock adjustment pin 74, thus allowing head platform 12 to be moved along mast upper portion 28.

Power supply platform 26 is supported by power supply platform sleeve 76, allowing up and down travel of power supply platform 26 relative to tripod lower mast portion 30. Mast guide track 77 extends vertically from a point near the intersection of legs 32 along the lower mast portion 30 and along the upper mast portion 28 to its upper end. Power supply platform sleeve 76 has a vertical wall slit (not shown) which allows sleeve 76 to travel along lower mast portion 30.

Power supply platform sleeve 76 includes a guide 78 at its base which slidingly fits over guide track 77, bridging the vertical wall slit to provide added sliding support for sleeve 76. In a similar manner, head platform sleeve 68 has a vertical wall slit (not shown) which allows sleeve 68 to travel along upper mast portion 28. Head platform sleeve 68 includes a guide 79 at its base which sliding fits over guide track 77, ridging the vertical wall slit to provide added sliding support for sleeve 68.

Figure 4:
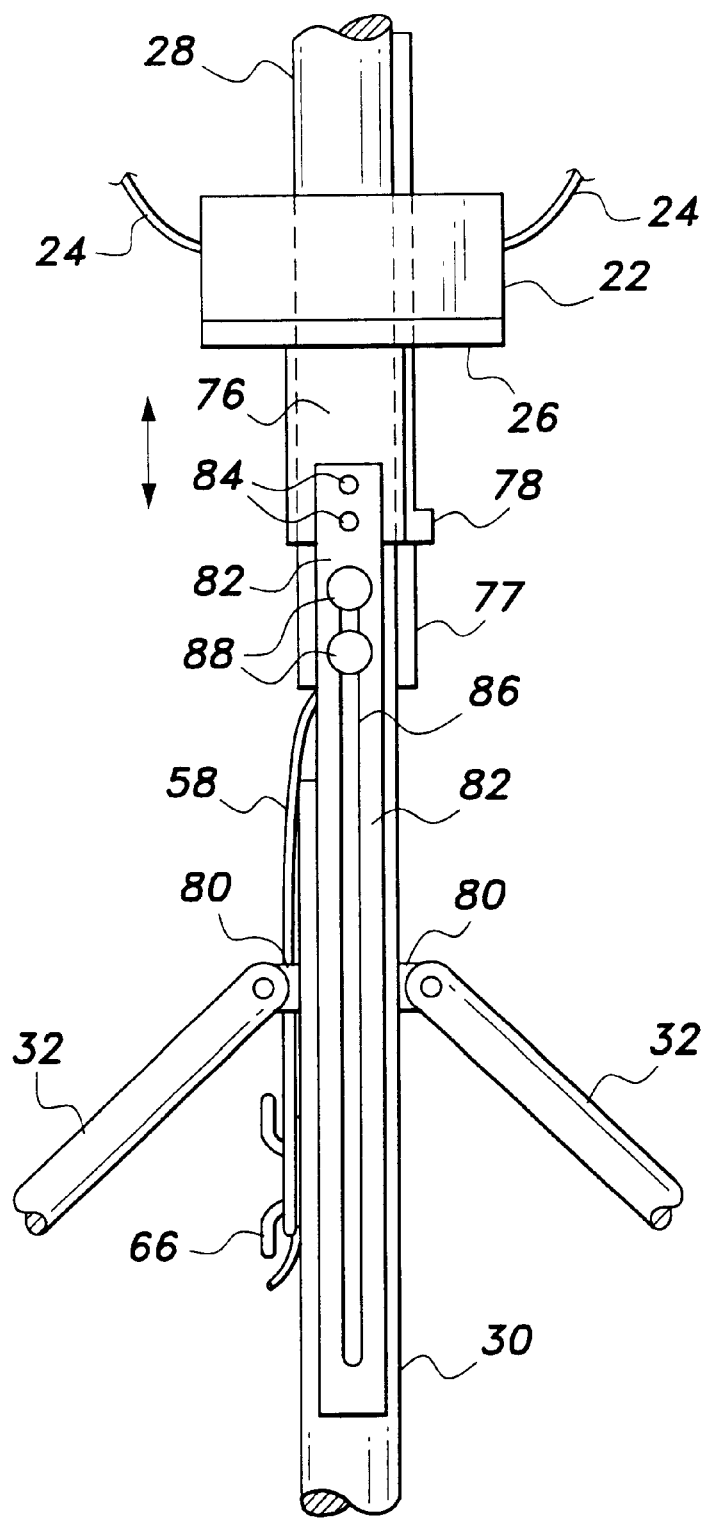
FIG. 4 is a side detail view of the lower portion of the adjustable tripod of FIG. 1 showing the lower height adjustment.

Referring to FIG. 4, there is shown a side detail view of the lower portion of the adjustable tripod of FIG. 1 showing the lower height adjustment. Tripod legs 32 are connected with mast lower portion 30 by tripod leg pivots 80.

Power supply platform locking track 82 is mounted on the lower portion of sleeve 76 by rivets 84 so as to extend vertically downward therefrom along mast lower portion 30 at a location extending below and avoiding interference with tripod leg pivots 80, halyard 58 and turnbuckle 66. A locking track groove 86 is spaced below sleeve 76 and extends along the substantial length of locking track 82, bisecting same. Vertically spaced locking screws 88 pass through locking track groove 86 and threadingly engage lower mast portion 30 so as to allow the locking of locking track 82 in a desired location by first loosening screws 88, moving track 82 upward or downward to a desired location, and then tightening screws 88, thus, locking track 82 against lower mast portion 30. The result of this adjustment is to position power supply platform 26 at the desired height as it is connected with locking track 82 by means of sleeve 76 and rivets 84.

Figure 5:
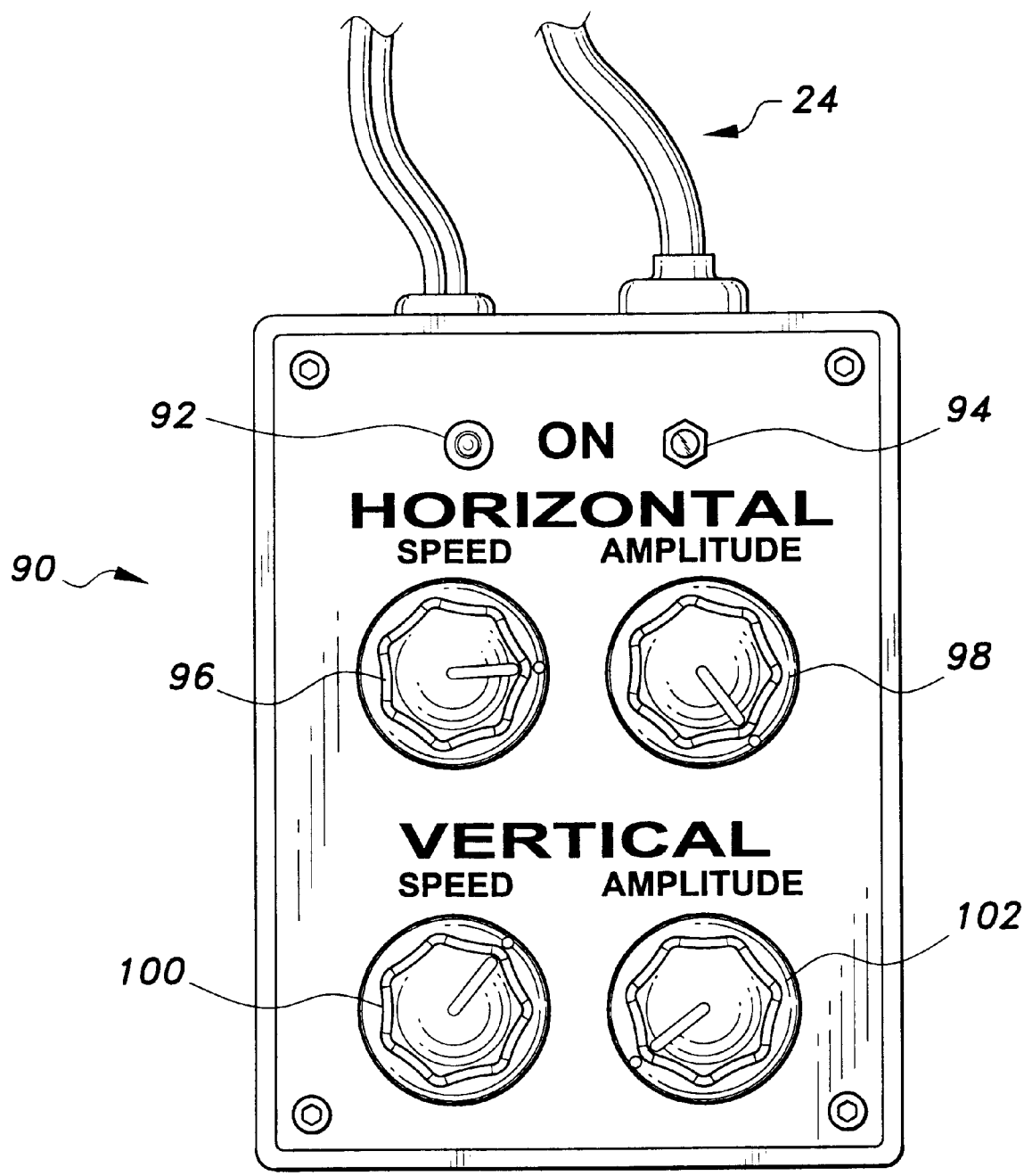
FIG. 5 is a detail view of the lower portion of the control boxes of the present invention as mounted on the rear of the batteries of the system of FIG. 1.

Referring to FIG. 5, there is shown a laser control 90 corresponding to an individual laser unit 14. Laser control 90 includes an off-on switch 92 for activating the laser unit 14 by means of battery power from power supply and laser control box 22. The laser control 90 may be independently mounted on tripod 12 or mounted on or within box 22. An indicator light 94 indicates whether the power is on or off to the control 90.

The laser beam emanating from the scanning laser unit 14 may be adjusted for horizontal scan speed by control knob 96 and for horizontal scan amplitude by control knob 98. The laser beam may also be adjusted for vertical scan speed by control knob 100 and for vertical scan amplitude by control knob 102. These controls control the radial scanning mirror drive actuator 46 (see FIG. 2) and the axial scanning mirror drive actuator (not shown) in a known manner to obtain a desired scanning pattern and speed.

In operation, scanning laser units 14, adjustably mounted on tripod 12, are secured at the desired height and directions so as to scan areas above the fruits to be protected from birds and other pests. Preferably the height is set such that the laser beams emanating therefrom skim the top of the fruit crop. The controls 90 are manipulated by the user so as to activate the laser beams and control their scanning patterns by control knobs 96, 98, 100, and 102 so the desired height, width, and rate of scan are achieved. Coverage may be selected to cover the most area of the fruit field, or to avoid exposure of certain locations, such as roads or paths used by humans, to the laser beam. The beams should be periodically adjusted by the operator so that pesky birds will not become accustomed to a particular pattern. The beams may also be adjusted to scan in a particular direction in applications where birds tend to habitually approach a fruit crop field from that direction.

The height of the laser units 14 may be adjusted as supported on head platform support 16 to a desired point along upper mast portion 28 by means of halyard 58 and locked in position by lock cam 72 on head platform sleeve 68. The power supply and control platform 26 may be adjusted to a desired height along lower mast portion 30 by means of locking track 82, depending from power supply and control platform sleeve 76 and locked in place by locking screws 88. It may be necessary to move the power supply and control platform 26 upward to allow the raising of head support platform 16 due to the fixed length of control signal cables 24. It will be necessary to periodically lower both head support platform 16 and power supply and control platform 26 for maintenance, adjustment of controls, and the changing of rechargeable gel batteries.

A desirable range of laser operating wavelengths for scaring birds is from about 432 nanometer to about 633 nanometers. This range is within the overlap of ultraviolet and human visible light which has the most impact on the eyes of birds.

It is to be understood that the present invention is not limited to the embodiment described above, but encompasses any and all embodiments within the scope of the following claims.

I claim:

1. A bird deterrent apparatus for protecting a field of crops, said apparatus comprising:

at least one laser unit emitting a laser light beam having a wavelength sufficient to frighten flying birds away from a field of crops without causing harm to the birds;

a scanner system disposed within said at least one laser unit for directing the laser light beam in a scanning pattern;

means for adjustably supporting said at least one laser unit at an elevated position, said supporting means includes a tripod having a mast with a vertically adjustable upper platform, wherein said upper platform pivotally and rotatably supports said at least one laser unit;

a halyard mounted at a top end of said mast for hoisting and lowering said upper platform;

control means disposed proximate said supporting means for actuating said at least one laser unit and adjusting the scanning pattern of the emitted laser light beam across the field of crops;

power supply means disposed proximate said supporting means for providing electrical power to the apparatus, and a vertically adjustable lower platform mounted at a lower portion of said mast for supporting said control means and said power supply means.

2. The bird deterrent apparatus according to claim 1, wherein said at least one laser unit is housed within a weather-protected box.

3. The bird deterrent apparatus according to claim 1, wherein the laser light beam emitted from said at least one laser unit has a wavelength in the range overlapping between ultraviolet and visible light.

4. The bird deterrent apparatus according to claim 3, wherein the laser light beam emitted from said at least one laser unit has a wavelength between about 432 nanometers to about 633 nanometers.

5. The bird deterrent apparatus according to claim 1, wherein said at least one laser unit includes two oppositely disposed laser units.

6. The bird deterrent apparatus according to claim 1, wherein said power supply means includes at least one rechargeable gel battery pack.

* * * * *